(No Model.)

S. WHITNEY.
CHURN.

No. 410,949. Patented Sept. 10, 1889.

Attest:
P. C. Masi.
Jn. Weister.

Inventor:
S. Whitney,
by E. W. Anderson,
atty.

UNITED STATES PATENT OFFICE.

SOLOMON WHITNEY, OF MANHATTAN, KANSAS.

CHURN.

SPECIFICATION forming part of Letters Patent No. 410,949, dated September 10, 1889.

Application filed January 31, 1888. Serial No. 262,585. (No model.)

*To all whom it may concern:*

Be it known that I, SOLOMON WHITNEY, a citizen of the United States, residing at Manhattan, in the county of Riley and State of Kansas, have invented a new and useful Improvement in Churns for Churning either Milk or Cream into Butter, of which the following is a specification.

This invention relates to certain improvements in churns, having for its object to simplify construction and render fully effective the action of the dasher, as also to utilize the churn-body in the churning operation; and to these ends the nature of the invention consists of the detailed construction and combination of the parts, as will fully appear from the following description and illustration, in which—

Figure 1:
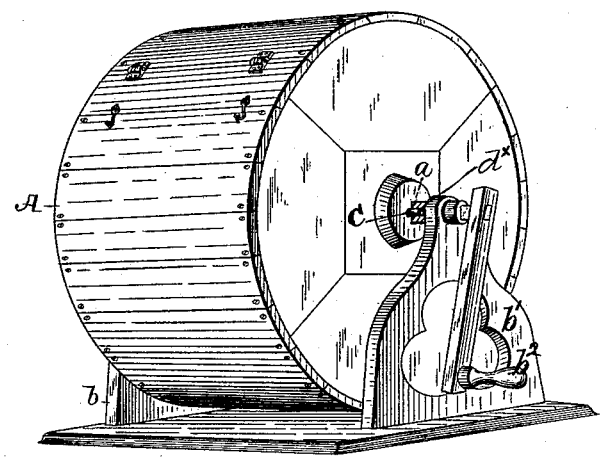
Figure 2:
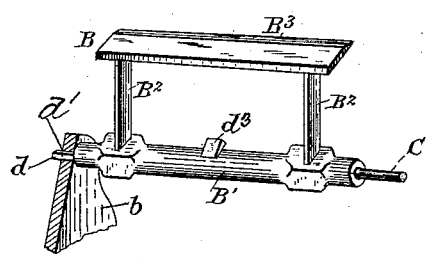
Figure 3:

Figure 1 is a perspective view of my improved churn. Fig. 2 is a detailed perspective view of the dasher, and Fig. 3 is a similar view of the dasher-supporting rod and the key for connecting the rod and dasher together.

In the embodiment of my invention I employ, preferably, a cylinder or churn-body A of suitable diameter and length, which is provided at one end with a shaft-extension $a$, bearing in one of two supports $b$ $b'$, and to which, so as to effect the rotation of the churn-body or cylinder, is applied a crank or handle $b^2$. A suitable covered opening is provided to the cylinder or body A to permit of access to its interior.

B is the dasher, which is provided with a tubular support or sleeve B', from which project vertically two arms or uprights $B^2$ $B^2$, upon the outer ends of which is secured a blade $B^3$, suitably beveled at one of its longitudinal edges to advantageously affect or cut (as it were) the cream or contents of the body or cylinder A as the latter is revolved. Through the dasher-sleeve B' is passed the rod C, which is cylindric throughout its length save at one end, being rectangular thereat, as at $d$, which rests in a corresponding slot or socket $d'$ in the support or bearing $b'$. The opposite end of the rod C enters and rests in a cylindric socket $d^\times$ in the inner end of the journal or shaft-extension $a$, whereby it will be seen that upon the rotation of the crank or handle $b^2$ the churn-body or cylinder will revolve, yet the supporting-rod, with its dasher, will remain stationary. The connection between the dasher and rod is effected by means of a key or wedge $d^3$ inserted through an aperture $d^2$ in the dasher-sleeve B' and into a slot $d^2$ in the rod C.

This churn is effective in the thorough conversion of the contents or cream placed therein in an expeditious manner and with the outlay of a minimum amount of labor.

Having described this invention, what I claim, and desire to secure by Letters Patent, is—

The combination of the cylinder or body having at one end an extension provided with a socket, the rod having an angular end resting in a corresponding socket in the framework and its opposite end resting in the socket of the said extension, and the dasher having a sleeve or tubular portion connected to said rod, substantially as set forth.

SOLOMON WHITNEY.

Witnesses:
WALTER TAYLOR,
CHAS. N. RUSSELL.